Nov. 11, 1969     D. Z. GLUCKSMAN ET AL     3,477,635
LOW NOISE NINETY DEGREE TRANSVERSE FLOW BLOWER WITH
IMPROVED HOUSING AND VORTEX CONTROL MEMBER
Filed Dec. 26, 1967
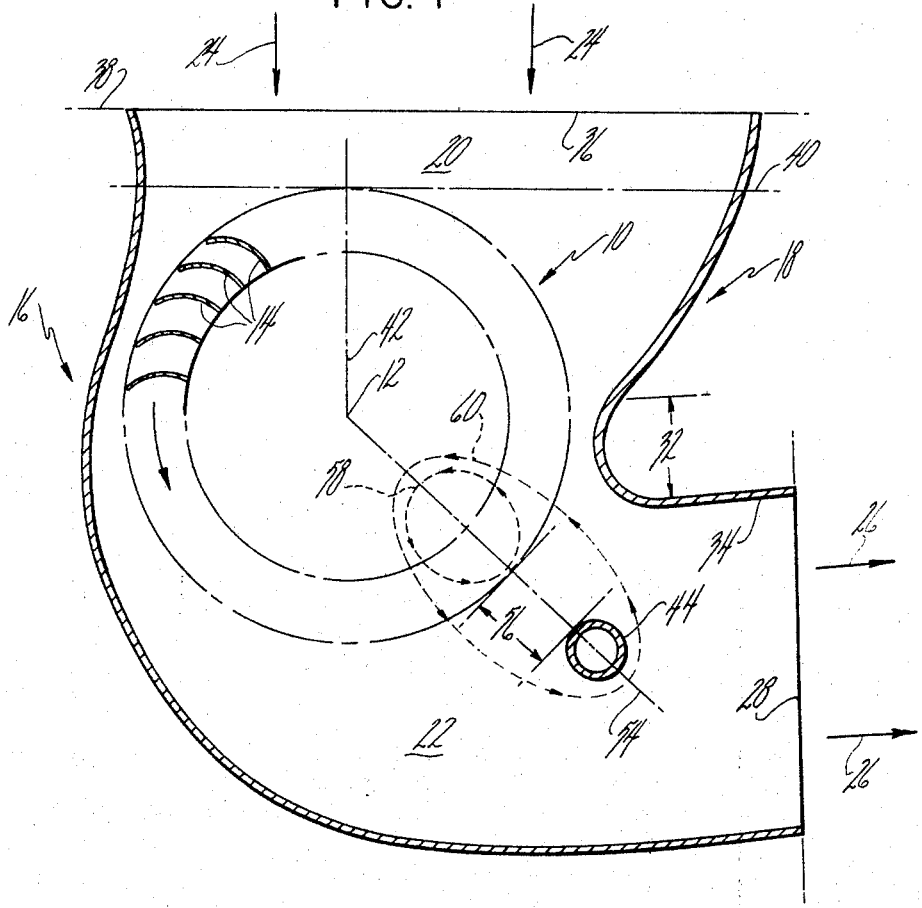
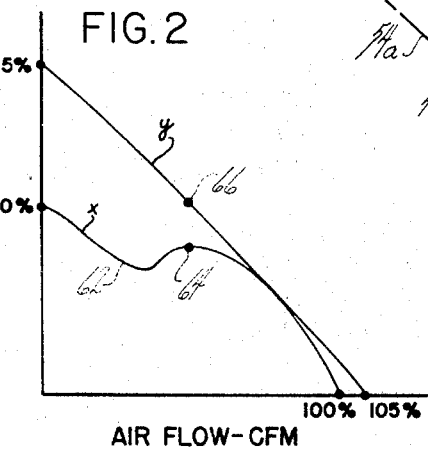
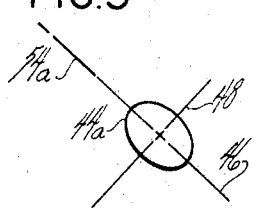
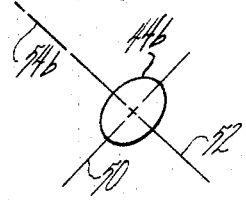
INVENTORS
DOV ZEEV GLUCKSMAN
THOMAS W. FAY
BY
ATTORNEYS United States Patent Office 3,477,635
Patented Nov. 11, 1969

3,477,635
LOW NOISE NINETY DEGREE TRANSVERSE FLOW BLOWER WITH IMPROVED HOUSING AND VORTEX CONTROL MEMBER
Dov Zeev Glucksman, West Newton, Mass., and Thomas W. Fay, New Britain, Conn., assignors to Torin Corporation, Torrington, Conn., a corporation of Connecticut
Filed Dec. 26, 1967, Ser. No. 693,556
Int. Cl. F04d 17/08, 29/44
U.S. Cl. 230—125       12 Claims

ABSTRACT OF THE DISCLOSURE

A low noise level ninety degree transverse flow blower comprising housing walls which extend beyond the rotor periphery on the inlet side and which direct air through approximately ninety degree in a smooth arcuate and low noise generation configuration throughout, and also comprising a judiciously located vortex control member having a smooth arcuate outer surface for minimum noise generation.

BACKGROUND OF INVENTION

Transverse flow blowers have appeared in the past in a wide variety of configurations as required to meet specific requirements. Relatively high performance blowers have been characterized by various features additional to a simple arcuate inner and outer housing wall construction and by high level noise generation. Thus, the Datwyler type of transverse flow blower, as illustrated in U.S. Patent 3,178,100 entitled "Fan," dated Apr. 13, 1965, is characterized by a relatively sharp cut-off section and by a vortex control member having relatively sharp edge or corner portions and which may take the form of a small elongated section of sheet metal. While contributing to the high performance characteristics of the blower, the sharp cut-off and the sharp edged vortex control members are found also to contribute substantially to a high level of noise generation.

A second type of high performance transverse flow blower includes at least one and in most instances a plurality of small chambers formed in the housing adjacent the rotor or periphery for air recirculation and other purposes. This type of blower may be referred to as a Coester blower and an illustrative example is found in U.S. Patent No. 3,181,777 entitled "Transverse Flow Blower" and dated May 4, 1965. The additional or auxiliary housing features in such blowers again contribute to high performance characteristics thereof but they are also contributive in substantial degree to a high level noise generation.

Relatively low performance transverse flow blowers have also been available heretofore and an example is found in a typical European design wherein simplified inner and outer housing walls are provided with a relatively sharp cut-off section and with 180° or more of the rotor exposed at the inlet side. As compared with the aforementioned blower types, the European design exhibits superior characteristics of design simplicity but provides lower performance including an undesirable stall characteristic and is not wholly satisfactory as to level of noise generation particularly with respect to high inlet noise conditions. Reference may be had to an article by Kenneth A. Merz, "Transverse Flow Fan" appearing in Product Engineering, Apr. 1, 1963, pages 51–55 for illustration and description of the typical European design under consideration.

SUMMARY OF INVENTION

It is the general object of the present invention to provide a transverse flow blower which embodies a judicious selection of housing and vortex member characteristic resulting in somewhat lower performance characteristics than the aforementioned Datwyler and Coester designs but with substantially improved noise characteristics, and which yet exhibits performance characteristics substantially better than those of the aforementioned European design particularly with respect to linearity of the performance curve and the improvement of stall-dip characteristics.

In fulfillment of this object, inner and outer housing walls are provided which extend beyond the rotor periphery at the inlet side for intake noise reduction, the walls are characterized by a smooth arcuate configuration throughout a gradually rounded cut-off section at the inner wall, and vortex control is provided for by means of a member which has a smooth arcuate and low noise generation outer surface and which is judiciously located with respect to the rotor periphery for desired performance characteristics and low noise generation. Further, the foregoing design characteristics are embodied in a blower particularly well-suited to, albeit not limited to, ninety degree air discharge i.e. the blower receives and discharges air directing the same through an angle of approximately ninety degrees from inlet to discharge.

BRIEF DESCRIPTION OF THE DRAWING

The drawing shows preferred embodiments of the invention and such embodiments have been described, but it will be understood that various changes may be made from the constructions disclosed and that the drawing and descriptions are not to be construed as defining or limiting the scope of the invention, the claims forming a part of this specification being relied upon for that purpose.

FIG. 1 is a schematic illustration in transverse section of a transverse flow blower embodying the present invention.

FIG. 2 is a graphical illustration of performance characteristics of a transverse flow blower of the invention with the performance characteristics of a European design blower.

FIG. 3 is a fragmentary view showing an alternative form of a vortex control member in transverse section.

FIG. 4 is a fragmentary view showing a second alternative form of a vortex control member in transverse section.

DESCRIPTION OF THE PREFERRED EMBODIMENTS

Referring particularly to FIG. 1, it will be observed that a blower unit shown therein comprises a blower wheel or rotor indicated generally at 10 and which is rotatable about an axis 12. The wheel or rotor 10 comprises a circumaxially spaced series of axial elongated fluid moving blades 14 which are preferably formed of sheet metal or plastic but which may vary widely in construction within the scope of the invention. The blades 14, 14 are convex viewed in a clockwise direction and the rotor 10 is adapted for rotation in a counterclockwise direction as indicated in its fluid moving operation.

A housing for the rotor 10 comprises spaced outer and inner axially elongated walls indicated generally respectively at 16 and 18. The walls 16, 18 define respectively on generally opposite sides of and peripherally adjacent the rotor 10 a low pressure fluid inlet chamber 20 and a high pressure fluid discharge chamber 22. Thus, fluid flow occurs in the direction on the arrows 24, 26 through the inlet chamber 20, the rotor 10 and the discharge chamber 22.

The outer or left-hand housing wall 16 is a common wall between the inlet and discharge chambers 20, 22 and extends in the direction of fluid flow adjacent the discharge chamber in a smooth spiraling surface outwardly and away from the periphery of the rotor 10 to a discharge chamber outlet opening 28 residing in a vertical plane 30.

The inner or right-hand housing wall 18 includes a cut-off section indicated at 32 and which is disposed between the inlet and discharge chambers 20, 22 adjacent and spaced radially outwardly from the periphery of the rotor 10. In order to provide for low level noise generation the cut-off section 32 is constructed in the form of a gradual convex curve viewed from the rotor outwardly. Further, the cut-off section 32 blends with a smooth surface section 34 of the wall 18 which extends from the cut-off section adjacent the discharge chamber 22 to define in cooperation with outer wall 16 the aforesaid discharge chamber outlet opening 28.

The portions of the outer and inner housing walls 16, 18 defining the inlet chamber 20 blend with and extend in smooth arcuate configuration respectively from the portion of the outer wall which defines the discharge chamber 22 and from the cut-off section 32. That is, the portion of the outer wall 16 adjacent the inlet chamber 20 extends upwardly from a lower spiral portion of said wall which defines the discharge chamber 22 to an inlet opening 36 which resides in a horizontal plane 38. Similarly, the inner wall 18 extends upwardly from the cut-off section 32, blending smoothly with the latter, upwardly to the inlet opening 36 and the plane 38. For purposes of intake noise reduction, the inlet chamber portions of the walls 16, 18 extend at least to a plane 40 normal to a rotor radius 42 at the rotor periphery and, as stated, the said wall portions extend further in the preferred embodiment shown to the plane 38. Still further, the inlet chamber defining portions of the outer and inner housing walls 16 and 18 preferably provide for converging fluid flow through the inlet chamber and, as shown, the said portion of the wall 16 converges slightly at an upper end portion and the corresponding portion of the wall 18 converges continuously between the plane 38 and the cut-off section 32.

As mentioned above, the invention is not limited to right-angular fluid flow through the blower unit but such fluid flow is particularly desirable in certain applications and the unit shown provides for the desired flow relationship. That is, the planes 28 and 36 of the discharge or outlet and inlet openings reside approximately at right angles with respect to each other. Thus, a blower unit constructed in accordance with the invention not only provides the advantages of low level noise generation and comparatively good performance but also effects a highly desirable inlet-outlet flow angle relationship.

In accordance with a further aspect of the invention, an axially extending vortex control member is provided in the discharge chamber 22 and such a member is indicated at 44 in the form of an elongated tube or dowel of uniform cylindrical cross section throughout its length. The use of a vortex control member of cylindrical configuration is not critical to the invention but it is essential that such member have a smooth arcuate and low noise generation outer surface in cross section. Thus, thin sheet metal forms or other cross sectional configurations having relatively sharp edges or corners are unsuited to the purposes of the invention and the limitations on cross sectional configuration of the control member 44 may be set out as follows. The member should be of relatively thick or bulky and rounded cross sectional configuration as contrasted with a thin configuration and has minor and major dimensions which are related right angularly with the latter dimension being no greater than twice the former. Preferably, the said minor and major dimensions are measured respectively along a pair of normal axes of the cross sectional form of the member and the member is symmetrical in cross section about each of the axes. Thus, alternative forms of the member 44 shown respectively at 44a in FIG. 3, and 44b in FIG. 4 are generally elliptical or rounded rectangular in cross section and respectively have major and minor axes 46, 48 and 50, 52. A radius of the rotor 10 is shown at 54 in FIG. 1 and is indicated at 54a in FIG. 3 and at 54b at FIG. 4. Thus, the control member 44a of FIG. 3 has its major axis 46 coincident with the radius 54a while the minor axis 52 of the control member 44b of FIG. 4 is coincident with the radius 54b. Other configurations and angular locations of control members such as 44a and 44b are contemplated within the scope of the invention but the essential limitations on cross sectional configuration as set forth above should be adhered to in all instances.

The overall cross sectional mass of the control member is also important in the provision of the desired performance and noise characteristics. Thus, the major dimension of the control member should be substantially less than ⅓ the width of the discharge chamber 22 and, in the case of a cylindrical control member such as 44, the diameter thereof should fall within the range of 7 to 25% of the diameter of the rotor 10. Preferably, and as shown, the diameter of the control member 44 is approximately 14% of the diameter of the rotor 10.

The space between the rotor periphery and the vortex control memebr is of particular importance. When the control member is positioned in close proximity to the rotor periphery, a high level of performance is provided for but a substantial increase in the level of noise generation is also encountered. Thus, in the FIG. 1 configuration, with a control member 44 positioned inwardly along the radius 54 so that the space 56 between the member and the rotor periphery is approximately ½ the control member diameter a high level of performance is achieved but as much as a ten decibel increase in sound or noise generation is encountered. That is, a 60 decibel sound generation condition may be encountered with the control member positioned as shown and a 70 decibel sound level generation condition encountered with the control member at the ½ diameter position. Thus, positioning of the control member at the location shown represents a very substantial improvement in sound level generation for a substantially lesser degree of performance loss. In view of the critical nature of sound or noise generation in transverse flow blowers, the gain in improved noise characteristics is much to be preferred over the slight performance loss. It is to be noted that when higher flow characteristics are desired, it is possible to provide a second identical blower and with the resulting double intensity noise, the increase in noise level will approximate only 3 decibels. Thus, increased performance can be easily achieved at a lesser expense in sound generation with blower units having properly designed and positioned vortex control members.

In accordance with the foregoing, control members such as the member 44, 44a and 44b should be positioned in the discharge chamber so as to be spaced along a radius from the rotor periphery a distance in the range from 15 to 30% of rotor diameter. In the presently preferred embodiment shown the space 56 between the rotor periphery and the vortex control member 44 is approximately 23.5% of the diameter of the rotor 10. With this arrangement, a judicious compromise is realized between noise and performance characteristics.

Still further in the exercise of vortex control, it is known that the vortex should be maintained substantially closer to the cut-off section than the outer wall in the discharge chamber. Thus, the distance between the vortex control member 44 and the inner housing wall 18 should be between 1 and 4 times the diameter of the member 44 and preferably the said spacing should fall in the range between 2 and 3 times control member diameter.

When the aforementioned size, configuration, and spacing limitations of the vortex control member are adhered to highly effective vortex control is achieved. Thus, a vortex, such as indicated by the broken line arrows 58, 60 is maintained at the desired position on the rotor periphery and vortex instability as may result in stall characteristics is avoided. Blower performance is somewhat lower than the aforementioned high performance blower designs but noise characteristics are substantially improved over the latter. On the other hand, blower performance is substantially better than that achieved with the aforementioned low performance European design with no unacceptable loss in noise characteristics. Referring particularly to FIG. 2, it will be observed that a curve *x*, representing a conventional European design exhibits a serious stall characteristic at 62. Such curve may also be taken as representative of a blower of the type shown in FIG. 1 but without the provision of a vortex control member such as 44. Viewing the curve *y* it will be observed that the pressure characteristics of the blower unit of FIG. 1 are greatly improved with respect to the curve *x*, 175% versus 100%, and that an appreciable improvement from 100% to 105% is achieved in flow characteristics. Moreover, the curve *y*, representing the blower unit of the present invention with the specific vortex control member described, is substantially linear. An operating point can be selected along the curve without the serious detrimental effects encountered with the stall type curve *x*. Thus, if an operating point were selected at 64 on the curve *x*, changing operating conditions might cause the point to move leftwardly into the stall region with serious performance loss. Similar changing operating conditions with the curve *y* and an operating point 66 result only in a predictable and in fact a beneficial consequence.

We claim:

1. A transverse flow blower unit comprising a rotor having a circumaxially spaced series of axially elongated fluid moving blades, a housing about said rotor including spaced outer and inner axially elongated walls defining respectively on generally opposite sides of and peripherally adjacent the rotor a low pressure fluid inlet chamber and a high pressure fluid discharge chamber, said outer and inner housing walls extending adjacent said inlet chamber to define an inlet opening which resides in a plane normal to a radius of said rotor and spaced from the rotor axis along the radius at least as far as the rotor periphery, said outer wall being a common wall between said inlet and discharge chambers and extending in the direction of fluid flow and adjacent the discharge chamber in a smooth spiraling surface outwardly and away from the periphery of the rotor to a discharge chamber outlet opening, and said inlet and outlet chamber portions of said outer wall blending together and extending in a smooth arcuate configuration, said inner wall having a cut-off section between said inlet and discharge chambers adjacent and spaced from the periphery of the rotor and extending therefrom in a smooth surface adjacent said discharge chamber to define in cooperation with said outer wall a discharge chamber outlet opening, said cut-off section forming a gradual convex curve viewed from the rotor outwardly, and said inlet chamber and outlet chamber portions of said inner wall blending with and extending in smooth arcuate configuration with said cut-off section, and an axially extending vortex control member in said discharge chamber spaced substantially closer to said inner wall and cut-off section than said outer wall and spaced from the rotor periphery a distance in the range from 15 to 30% of the rotor diameter, said member having a smooth arcuate outer surface in cross section and right angularly related minor and major dimensions, the latter dimension being no greater than twice the former.

2. A transverse flow blower unit as set forth in claim 1 wherein said inlet and outlet openings reside in planes arranged approximately at right angles to each other.

3. A transverse flow blower unit as set forth in claim 1 wherein the space between said rotor periphery and said vortex control member is approximately 23.5% of the rotor diameter.

4. A transverse flow blower unit as set forth in claim 1 wherein said axially extending vortex control member is of uniform and substantially cylindrical cross sectional configuration throughout its length.

5. A transverse flow blower unit as set forth in claim 4 wherein said cylindrical vortex control member has a diameter in the range of 7 to 25% of the rotor diameter.

6. A transverse flow blower unit as set forth in claim 5 wherein said control member diameter is approximately 14% of the rotor diameter.

7. A transverse flow blower unit as set forth in claim 4 wherein said vortex control member is spaced from said inner housing wall a distance in the range between 1 and 4 times its diameter.

8. A transverse flow blower unit as set forth in claim 4 wherein said vortex control member is spaced from said inner housing wall a distance in the range between 2 and 3 times its diameter.

9. A transverse flow blower unit as set forth in claim 1 wherein said vortex control member is symmetrical in cross section about each of a pair of normal axes along which said major and minor dimensions are measured respectively.

10. A transverse flow blower unit as set forth in claim 1 wherein said control member has a major dimension greater than its said minor dimension.

11. A transverse flow blower unit as set forth in claim 1 wherein said control member major dimension is coincident with a rotor radius.

12. A transverse flow blower unit as set forth in claim 10 wherein said control member minor dimension is coincident with a rotor radius.

References Cited

UNITED STATES PATENTS

| 3,249,292 | 5/1966 | Eck et al. |
| 3,306,526 | 2/1967 | Laing. |
| 3,325,089 | 6/1967 | Vogler. |

FOREIGN PATENTS

| 876,620 | 9/1961 | Great Britain. |

HENRY F. RADUAZO, Primary Examiner

U.S. Cl. X.R.

230—133